(12) United States Patent
Wang et al.

(10) Patent No.: US 8,359,127 B2
(45) Date of Patent: Jan. 22, 2013

(54) SERVER AND METHOD OF CONTROLLING AUTOMATED GUIDED VEHICLES

(75) Inventors: Chi-Chih Wang, New Taipei (TW); Rui-Jun Wang, Shenzhen (CN); Zhi-Long Li, Shenzhen (CN); Yao-Feng Li, Shenzhen (CN)

(73) Assignees: GDS Software (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/280,360

(22) Filed: Oct. 25, 2011

(65) Prior Publication Data

US 2012/0303180 A1 Nov. 29, 2012

(30) Foreign Application Priority Data

May 23, 2011 (CN) .......................... 2011 1 0135137

(51) Int. Cl.
*G05D 1/00* (2006.01)

(52) U.S. Cl. .................................. 701/2; 703/8; 340/22

(58) Field of Classification Search .......... 701/2, 23–25, 701/408–411; 340/22; 703/8
See application file for complete search history.

(56) References Cited

U.S. PATENT DOCUMENTS 6,092,010 A * 7/2000 Alofs et al. ..................... 701/23
6,507,777 B1 * 1/2003 Pinlam et al. .................. 701/23

* cited by examiner

*Primary Examiner* — Mary Cheung
*Assistant Examiner* — Brian P. Sweeney
(74) *Attorney, Agent, or Firm* — Altis Law Group, Inc.

(57) ABSTRACT

A server communicates with one or more work machines and automated guided vehicles (AGVs) via a wireless network. When receiving a request signal for desired material, the server analyzes the request signal to determine a location of the work machine, and searches for an AGV according to basic information of a production scene stored a storage device. The server further generates a control command according to the location of the work machine, a starting location of the searched AGV, and arrangement information of AGV tracks obtained from the basic information, and controls the searched AGV to move to the location of the work machine according to the control command, to delivered the desired material carried by the searched AGV to the work machine.

15 Claims, 4 Drawing Sheets

SERVER AND METHOD OF CONTROLLING AUTOMATED GUIDED VEHICLES

BACKGROUND

1. Technical Field

The embodiments of the present disclosure relate to automatic control technology, and particularly to a server and a method of controlling automated guided vehicles.

2. Description of Related Art

Automated guided vehicles (AGVs) are mobile robots used in industrial applications to move materials around a manufacturing facility or a warehouse of a factory. AGVs often follow fixed tracks, which may consist of markers and electrical wires in the floor. However, at present, controlling movement of the AGVs is done manually. For example, the movement route of an AGV is often set by an engineer of the factory, and the starting and ending of the movement of the AGV is often determined by an operator in a production scene of the factory.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
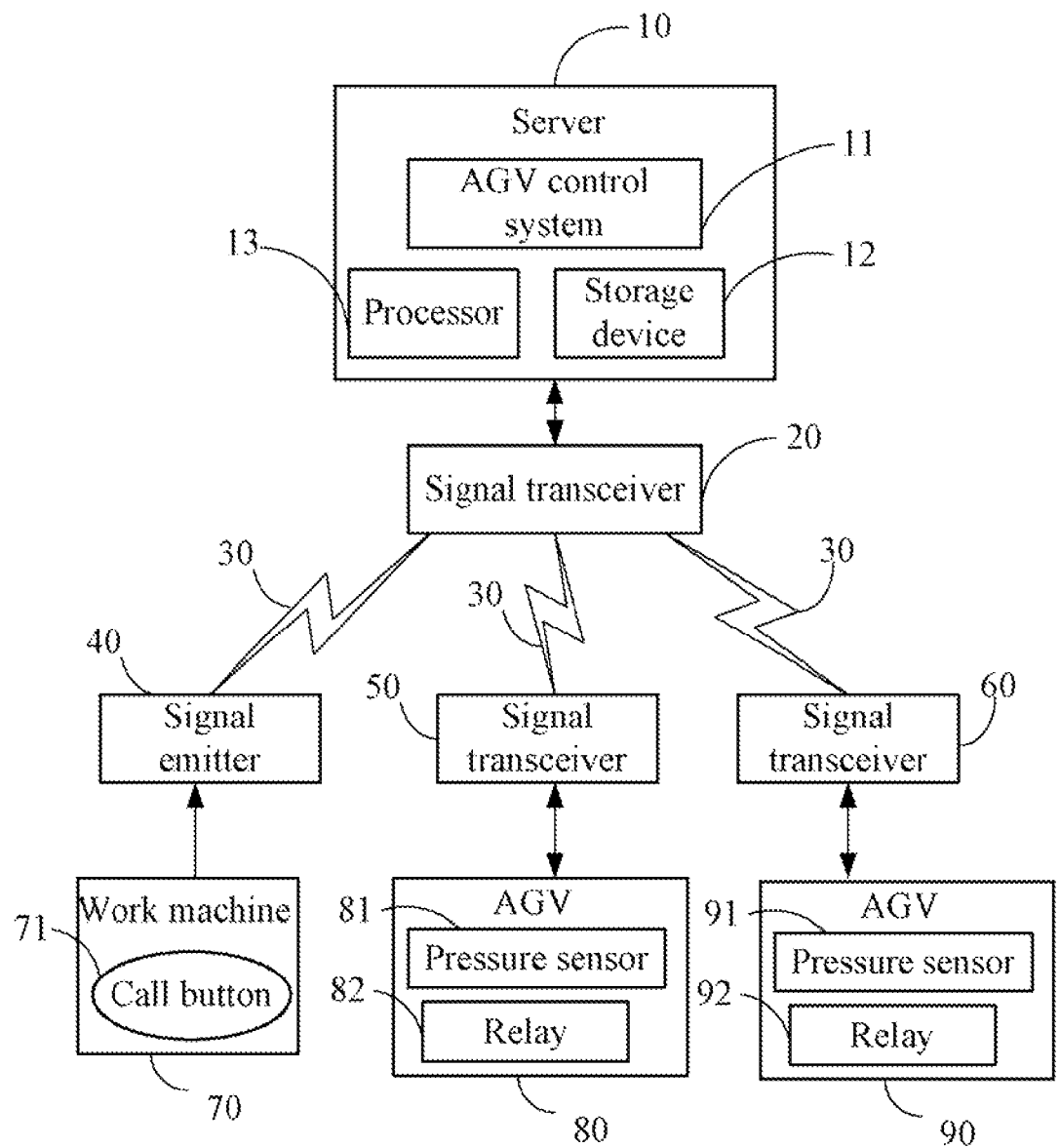
FIG. 1 is a block diagram of one embodiment of an application environment of a server for controlling automated guided vehicles.

FIG. 1 is a block diagram of one embodiment of an application environment of a server 10 including an automated guide vehicle (AGV) control system 11. In one embodiment, the server 10 further includes a storage device 12 and a processor 13. The storage device 12 stores basic information regarding a production environment (production scene) of a factory. The production scene may be a workshop. The basic information includes layout information and hardware information. The layout information includes information as to the arrangement of various production devices and the storage locations of different kinds of materials. The production devices may include a plurality of work machines 70 (only one shown), a plurality of automated guided vehicles (AGVs), such as AGVs 80 and 90 shown in FIG. 1, and a plurality of AGV tracks. The AGV tracks may consist of markers and electrical wires in/on the floor of the production scene, whereby the AGVs may follow the AGV tracks. The work machines 70 may be used for, but are not limited to, producing, polishing, or assembling parts. The hardware information includes device names, vendor information, version numbers, feature descriptions, and a current status of the production devices. The current status of a production device (e.g., an AGV) may include whether the device is idle or busy, and whether the device is empty (i.e., carrying no material) or has a store of material.

In one embodiment, the AGV control system 11 receives request signals to supply material(s), sent either by the work machines 70 or by the AGVs, via a signal transceiver 20 and a wireless network 30, and the system 11 sends commands to control movements of the AGVs, to deliver materials to the work machines 70 by the AGVs, or for the AGVs to collect materials from storage(s) where the materials are stored. The work machines 70 send the request signals to the wireless network 30 using signal emitters 40, and the AGVs sends the request signals to the wireless network 30 and receives the control commands from the wireless network 30 using signal transceivers, such as the signal transceivers 50 and 60 shown in FIG. 1.

In one embodiment, the wireless network 30 may be the Zigbee® wireless standard, WI-FI® wireless standard, or any other suitable wireless standard. A pressure sensor and a relay are installed in every AGV, including the AGV 80 and the AGV 90. In one embodiment, the material carried by each AGV may be on a top surface of the AGV, and the pressure sensor may be installed under the top surface of the AGV. The pressure sensor may determine if all the material carried by the AGV has been removed according to pressure changes detected by the pressure sensor. For example, if the detected pressure is less than a preset pressure, the pressure sensor may determine that all the material carried by the AGV has been removed, and may trigger the relay to generate a request signal of collecting materials from a storage location.

Figure 2:
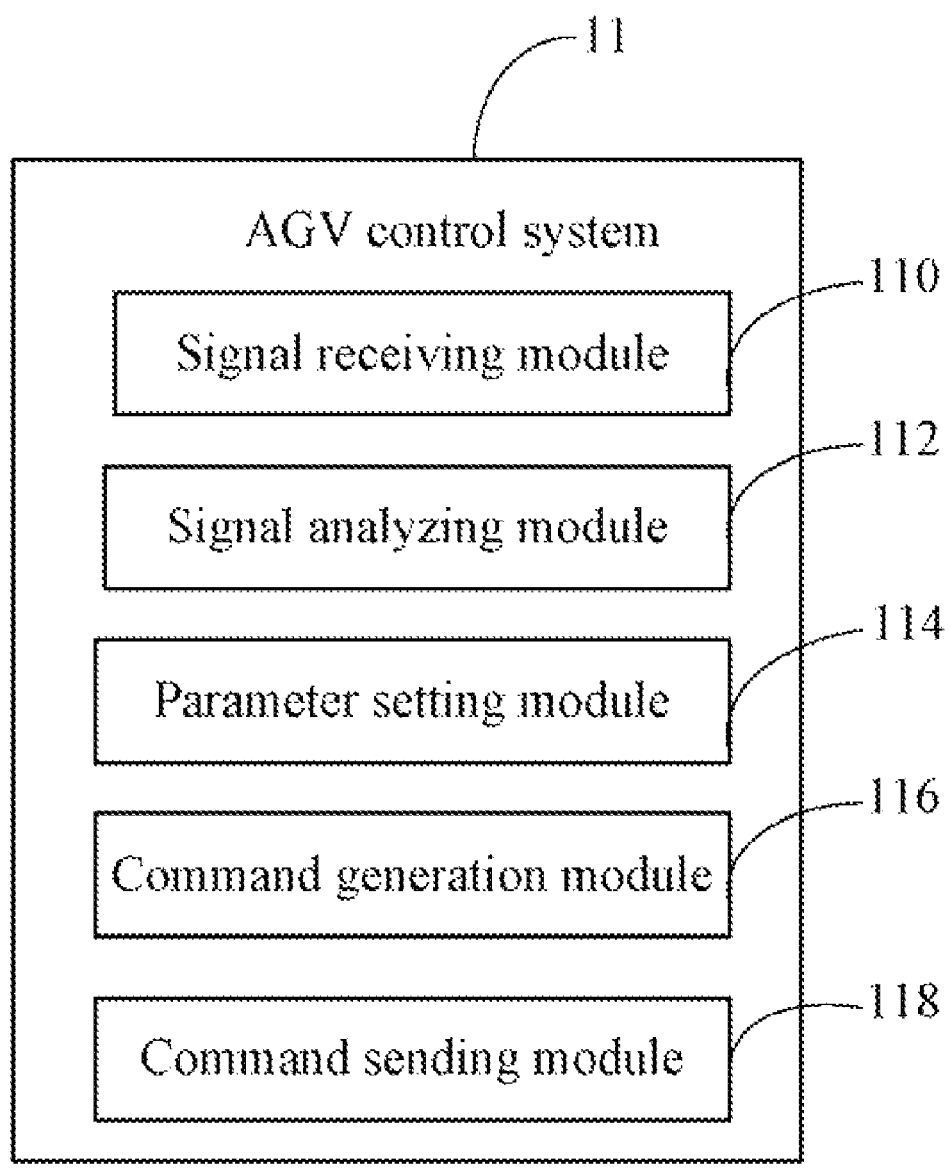
FIG. 2 is a block diagram of one embodiment of function modules of the server included in FIG. 1.

FIG. 2 is a block diagram of one embodiment of function modules of the AGV control system 11. In one embodiment, the AGV control system 11 includes a signal receiving module 110, a signal analyzing module 112, a parameter setting module 114, a command generation module 116, and a command sending module 118. The modules 110-1118 may include computerized code in the form of one or more programs that are stored in the storage device 112. The computerized code includes instructions that are executed by the processor 113 to provide the below-described functions of the modules 110-118 (illustrated in FIG. 3 and FIG. 4). The storage device 112 may be a cache or a dedicated memory, such as an EPROM, HDD, or flash memory.

Figure 3:
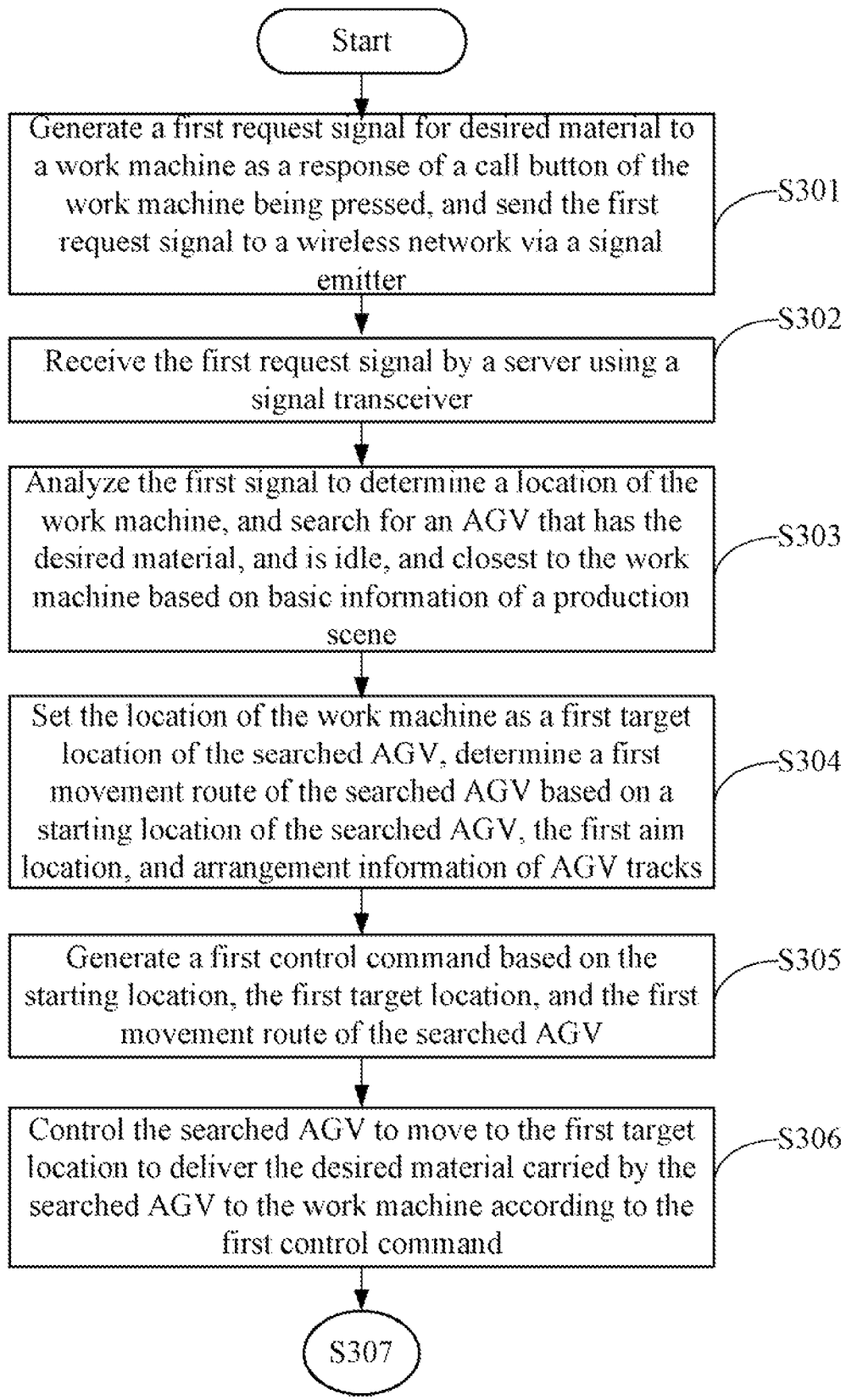
FIG. 3 and FIG. 4 are flowcharts of one embodiment of a method of controlling automated guided vehicles.
Figure 4:
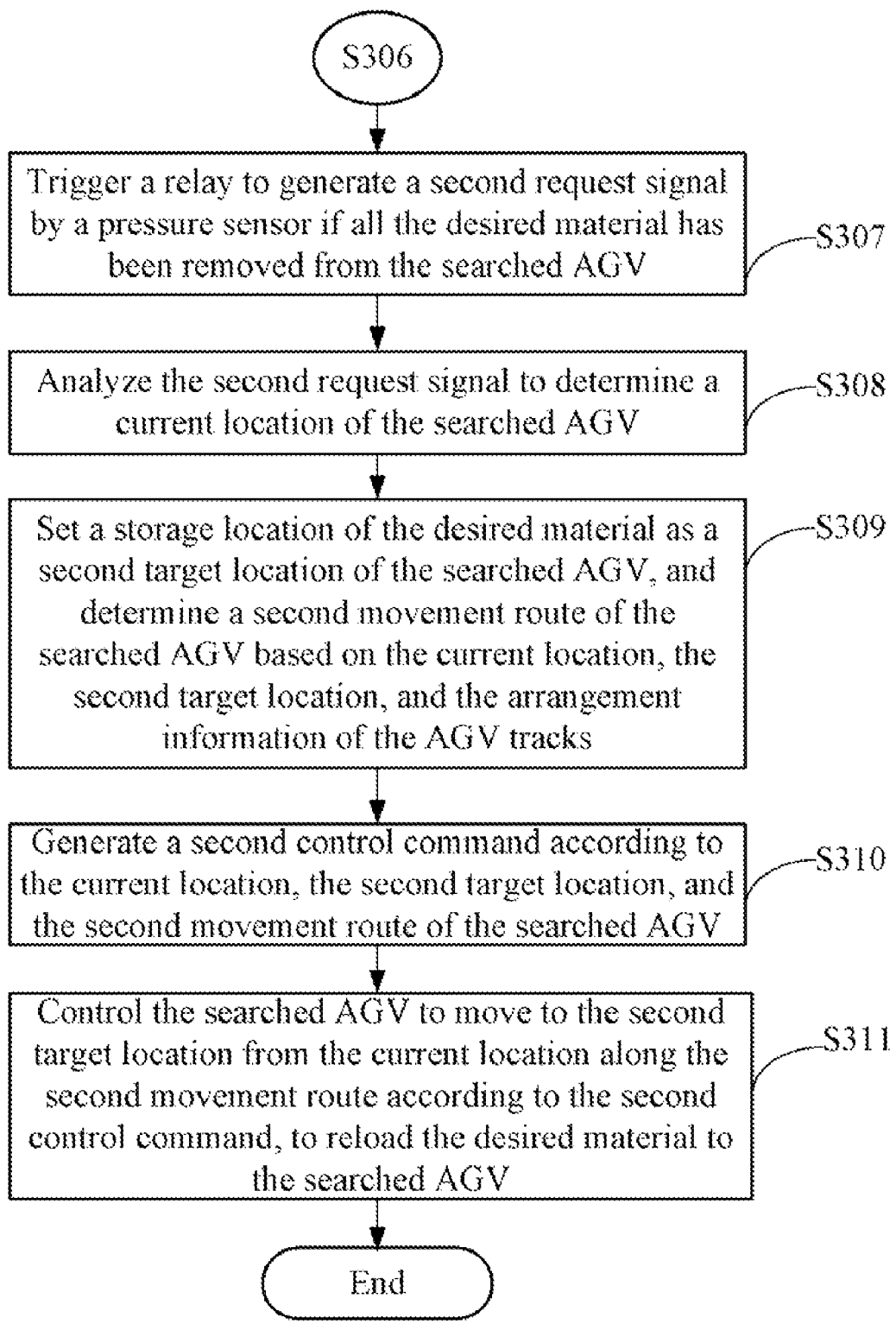

FIG. 3 and FIG. 4 are flowcharts of one embodiment of a method of controlling the AGVs. Depending on the embodiment, additional blocks may be added, others removed, and the ordering of the blocks may be changed.

In block S301, a work machine 70 generates a first request signal for a desired material, as a response to a call button 71 of the work machine being pressed, and sends the request signal to the wireless network 30 via the signal emitter 40. An operator may press the call button 71 when an amount of remaining material is less than a predetermined amount.

In block S302, the signal receiving module 110 receives the first request signal from the wireless network 30 via the signal transceiver 20. In one embodiment, the first request signal includes the location information of the work machine 70 and information as to the desired material, such as a name and a quantity of the desired material.

In block S303, the signal analyzing module 112 analyzes the first request signal to determine the location of the work machine 70, and searches for an AGV that has the desired material, and is idle, and is closest to the work machine 70, according to the basic information of the production scene stored in the storage device 12. For example, referring to FIG. 1, the signal analyzing module 112 may determine that the AGV 80 is nearest to the work machine 70 based on the layout information of the production scene, then may further determine if the AGV 80 is idle and has the desired material according to the hardware information relevant to that AGV 80. If the AGV is empty, whether busy or idle, the signal analyzing module 112 may further search out a next AGV (e.g., the AGV 90) that is less nearest to the work machine 70, but is idle and has the desired material.

In block S304, the parameter setting module 114 sets the location of the work machine 70 as a first target location of the searched AGV, determines a first movement route of the searched AGV based on a starting location of the searched AGV, the first target location, and the arrangement information of the AGV tracks. For example, the location of the work machine 70 may be set as the first target location of the AGV 80, then the first movement route of the AGV 80 may be determined based on the starting location of the AGV 80, the location of the work machine 70, and the arrangement information of the AGV tracks.

In block S305, the command generation module 116 generates a first control command based on the starting location, the first target location, and the first movement route of the searched AGV.

In block S306, the command sending module 118 sends the first control command to the searched AGV, to control the searched AGV to move to the first target location to deliver the desired material to the work machine 70. For example, the first control command may be sent to the AGV 80 to activate the AGV 80 to move to the work machine 70 along the first movement route.

In block S307, the pressure sensor of the searched AGV triggers the relay of the searched AGV to generate a second request signal as all the desired material carried by the searched AGV is removed, namely the material carried by the searched AGV has been fed to the work machine 70. As mentioned above, if the pressure detected by the pressure sensor is less than a preset pressure, the pressure sensor determines that the material carried by the AGV has been removed and triggers the relay to generate the second request signal. The second request signal from an AGV is regarded as a request to collect more material from the storage of the material.

In block S308, the receiving module 110 receives the second request signal, and the signal analyzing module 112 analyzes the second request signal to determine a current location of the searched AGV. For example, the current location of the AGV 80 may be the same location as the work machine 70.

In block S309, the parameter setting module 114 sets the storage location of the desired material as a second target location of the searched AGV, and determines a second movement route of the searched AGV based on the current location, the second target location, and the arrangement information of the AGV tracks.

In block S310, the command generation module 116 generates a second control command based on the current location, the second target location, and the second movement route of the searched AGV.

In block S311, the command sending module 118 sends the second control command to the searched AGV, to control the searched AGV to move to the storage location of the desired material, to reload the desired material to the searched AGV.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method of controlling automated guided vehicles (AGVs) being performed by execution of computer readable program code by a processor of a server, the server communicating with one or more work machines and AGVs via a wireless network, the method comprising:
   receiving a first request signal for desired material from a work machine;
   analyzing the first request signal to determine a location of the work machine, and searching for an AGV that has the desired material, is idle, and is closest to the work machine, according to basic information of a production scene that are stored in a storage device of the server;
   setting the location of the work machine as a first target location of the searched AGV, determining a first movement route of the searched AGV based on a starting location of the searched AGV, the first target location, and arrangement information of AGV tracks obtained from the basic information of the production scene;
   generating a first control command based on the starting location, the first target location, and the first movement route of the searched AGV;
   sending the first control command to the searched AGV, to control the searched AGV to move to the first target location, to deliver the desired material to the work machine;
   receiving a second request signal generated by the searched AGV as all the desired material carried by the searched AGV has been removed;
   analyzing the second request signal to determine a current location of the searched AGV;
   setting a storage location of the desired material recorded in the basic information of the production scene as a second target location of the searched AGV, and determining a second movement route of the searched AGV based on the current location, the second target location, and the arrangement information of the AGV tracks;
   generating a second control command according to the current location, the second target location, and the second movement route of the searched AGV; and
   sending the second control command to the searched AGV, to control the searched AGV to move to the storage location of the desired material, to reload the desired material to the searched AGV.

2. The method of claim 1, wherein each AGV carries material on a top surface, and is installed with a pressure sensor under the top surface, and the pressure sensor determines if the carried material has been removed according to pressure changes detected by the pressure sensor.

3. The method of claim 2, wherein each AGV further comprises a relay, and the pressure sensor triggers the relay to generate the second request signal in response that a pressure detected by the pressure sensor is less than a preset pressure.

4. The method of claim 1, wherein: the basic information of the production scene comprises layout information and hardware information of the production scene, the layout information comprises the arrangement information of the AGV tracks and storage locations of different kinds of materials, and the hardware information comprises a current status of each AGV.

5. The method of claim 4, wherein: the AGV tracks consist of markers and electrical wires in the floor of the production scene, and movements of the AGVs follow the AGV tracks, and the current status of each AGV comprises whether the AGV is idle or busy, and whether the AGV carries material or not.

6. A non-transitory medium storing a set of instructions, the set of instructions capable of being executed by a processor of a server to perform a method of controlling automated guided vehicles (AGVs), the server communicating with one or more work machines and AGVs via a wireless network, the method comprising:
- receiving a first request signal for desired material from a work machine;
- analyzing the first request signal to determine a location of the work machine, and searching for an AGV that has the desired material, is idle, and is closest to the work machine, according to basic information of a production scene that are stored in a storage device of the server;
- setting the location of the work machine as a first target location of the searched AGV, determining a first movement route of the searched AGV based on a starting location of the searched AGV, the first target location, and arrangement information of AGV tracks obtained from the basic information of the production scene;
- generating a first control command based on the starting location, the first target location, and the first movement route of the searched AGV;
- sending the first control command to the searched AGV, to control the searched AGV to move to the first target location, to deliver the desired material to the work machine;
- receiving a second request signal generated by the searched AGV as all the desired material carried by the searched AGV has been removed;
- analyzing the second request signal to determine a current location of the searched AGV;
- setting a storage location of the desired material recorded in the basic information of the production scene as a second target location of the searched AGV, and determining a second movement route of the searched AGV based on the current location, the second target location, and the arrangement information of the AGV tracks;
- generating a second control command according to the current location, the second target location, and the second movement route of the searched AGV; and
- sending the second control command to the searched AGV, to control the searched AGV to move to the storage location of the desired material, to reload the desired material to the searched AGV.

7. The medium of claim 6, wherein each AGV carries material on a top surface and is installed with a pressure sensor under the top surface, and the pressure sensor determines if the carried material has been removed according to pressure changes detected by the pressure sensor.

8. The medium of claim 7, wherein each AGV further comprises a relay, and the pressure sensor triggers the relay to generate the second request signal in response that a pressure detected by the pressure sensor is less than a preset pressure.

9. The medium of claim 6, wherein: the basic information of the production scene comprises layout information and hardware information of the production scene, the layout information comprises the arrangement information of the AGV tracks and storage locations of different kinds of materials, and the hardware information comprises a current status of each AGV.

10. The medium of claim 9, wherein: the AGV tracks consist of markers and electrical wires in the floor of the production scene, movements of the AGVs follow the AGV tracks, and the current status of each AGV comprises whether the AGV is idle or busy, and whether the AGV carries material or not.

11. A server communicating with one or more work machines and automated guided vehicles (AGVs) via a wireless network, the server comprising:
- a storage device;
- a processor; and
- one or more programs stored in the storage device and being executable by the processor, the one or more programs comprising instructions to:
- receive a first request signal for desired material from a work machine;
- analyze the first request signal to determine a location of the work machine, and search for an AGV that has the desired material, is idle, and is closest to the work machine, according to basic information of a production scene that are stored in a storage device of the server;
- set the location of the work machine as a first target location of the searched AGV, determine a first movement route of the searched AGV based on a starting location of the searched AGV, the first target location, and arrangement information of AGV tracks obtained from the basic information of the production scene;
- generate a first control command based on the starting location, the first target location, and the first movement route of the searched AGV;
- send the first control command to the searched AGV, to control the searched AGV to move to the first target location, to deliver the desired material to the work machine;
- receive a second request signal generated by the searched AGV as all the desired material carried by the searched AGV has been removed;
- analyze the second request signal to determine a current location of the searched AGV;
- set a storage location of the desired material recorded in the basic information of the production scene as a second target location of the searched AGV, and determine a second movement route of the searched AGV based on the current location, the second target location, and the arrangement information of the AGV tracks;
- generate a second control command according to the current location, the second target location, and the second movement route of the searched AGV; and
- send the second control command to the searched AGV, to control the searched AGV to move to the storage location of the desired material, to reload the desired material to the searched AGV.

12. The server of claim 11, wherein each AGV carries material on a top surface and is installed with a pressure sensor under the top surface, and the pressure sensor determines if the carried material has been removed according to pressure changes detected by the pressure sensor.

13. The server of claim 12, wherein each AGV further comprises a relay, and the pressure sensor triggers the relay to generate the second request signal in response that a pressure detected by the pressure sensor is less than a preset pressure.

14. The server of claim 11, wherein: the basic information of the production scene comprises layout information and hardware information of the production scene, the layout information comprises the arrangement information of the AGV tracks and storage locations of different kinds of materials, and the hardware information comprises a current status of each AGV.

15. The server of claim 14, wherein: the AGV tracks consist of markers and electrical wires in the floor of the production scene, movements of the AGVs follow the AGV tracks, and the current status of each AGV comprises whether the AGV is idle or busy, and whether the AGV carries material or not.

* * * * *